(12) United States Patent
Wirtanen et al.

(10) Patent No.: US 12,446,104 B2
(45) Date of Patent: Oct. 14, 2025

(54) DYNAMICALLY CONTROLLABLE AND ADAPTABLE VEHICLE PAGING RESPONSE

(71) Applicant: FORD GLOBAL TECHNOLOGIES, LLC, Dearborn, MI (US)

(72) Inventors: Jeffrey William Wirtanen, Kanata (CA); Muhammad Khaledul Islam, Ottawa (CA); Yihai Zhang, Kanata (CA)

(73) Assignee: Ford Global Technologies, LLC, Dearborn, MI (US)

( * ) Notice: Subject to any disclaimer, the term of this patent is extended or adjusted under 35 U.S.C. 154(b) by 496 days.

(21) Appl. No.: 18/080,937

(22) Filed: Dec. 14, 2022

(65) Prior Publication Data

US 2024/0206007 A1 Jun. 20, 2024

(51) Int. Cl.
*H04W 76/28* (2018.01)
*H04W 4/40* (2018.01)
*H04W 72/51* (2023.01)

(52) U.S. Cl.
CPC ............ *H04W 76/28* (2018.02); *H04W 4/40* (2018.02); *H04W 72/51* (2023.01)

(58) Field of Classification Search
CPC ........ H04W 72/51; H04W 4/40; H04W 76/28
See application file for complete search history.

(56) References Cited

U.S. PATENT DOCUMENTS

| | | | | |
|---|---|---|---|---|
| 2010/0182968 | A1* | 7/2010 | Ojala | H04W 72/23 370/329 |
| 2016/0057723 | A1 | 2/2016 | Horn et al. | |
| 2016/0212642 | A1* | 7/2016 | Ljung | H04W 76/28 |
| 2017/0289940 | A1* | 10/2017 | Yang | H04W 76/27 |
| 2019/0113964 | A1 | 4/2019 | Hardin et al. | |
| 2019/0166577 | A1* | 5/2019 | Tombaz | H04W 68/02 |
| 2020/0092685 | A1* | 3/2020 | Fehrenbach | H04W 36/08 |
| 2021/0153022 | A1* | 5/2021 | Ohlsson | H04W 8/24 |
| 2021/0219377 | A1* | 7/2021 | Balasubramanian | H04W 76/27 |
| 2021/0243836 | A1* | 8/2021 | Wu | H04W 76/14 |
| 2021/0314909 | A1* | 10/2021 | Agiwal | H04W 72/23 |
| 2023/0048799 | A1* | 2/2023 | Lei | H04W 76/15 |
| 2023/0073015 | A1* | 3/2023 | Khan | H04W 4/44 |
| 2023/0188992 | A1* | 6/2023 | Schliwa-Bertling | H04W 12/10 726/6 |
| 2024/0251475 | A1* | 7/2024 | Balasubramanian | H04W 76/11 |

FOREIGN PATENT DOCUMENTS

WO 2018226238 A1 12/2018

\* cited by examiner

*Primary Examiner* — Ajay Cattungal
(74) *Attorney, Agent, or Firm* — Joseph Zane; Brooks Kushman P.C.

(57) ABSTRACT

A vehicle determines the value of at least one predefined variable related to predefined contexts for discontinuous reception (DRX) cycle control during an engine-off state of the vehicle. The vehicle determines how a current DRX cycle should be changed responsive to the value of the at least one predefined variable in accordance with a control strategy associated with the at least one variable and, responsive to the determining how the cycle should be changed, automatically changes the current DRX cycle in accordance with the control strategy while the vehicle remains powered down.

20 Claims, 3 Drawing Sheets

DYNAMICALLY CONTROLLABLE AND ADAPTABLE VEHICLE PAGING RESPONSE

TECHNICAL FIELD

The illustrative embodiments generally relate to dynamically controllable and adaptable vehicle paging response.

BACKGROUND

When a vehicle is in a power off state, it is still capable of receiving incoming commands from remote entities. This, however, may require paging the vehicle over a discontinuous reception (DRX) cycle. Because the cycle is discontinuous, the page may not be received until the cycle lapses. A cycle can run, for example, for 1280 ms, or 1.28 seconds. This means that a page attempted when the cycle has just reset may require 1.279 seconds to be received. On average, this DRX cycle will have a latency of 0.64 seconds.

While 0.64 seconds may not seem to be a particularly large amount of time, it is reflected in the delay between a command entry and an active response from the vehicle, and it is a noticeable delay when compared to a response of a vehicle not in DRX cycle. This can lead to a customer believing that the technology is glitching, even though the DRX cycle merely allows for near-continual connection without perpetual battery usage. Customers in a hurry may perceive the delay to be much greater than it actually is, and as noted, some customers may even experience a delay equal to almost the full DRX cycle. In world where devices are expected to be instantaneously controllable, a delay of 1.27 seconds can feel like an eternity. It can result in additional button presses to send a command, and a general sense of customer dissatisfaction.

SUMMARY

In a first illustrative embodiment, a vehicle includes one or more processors configured to determine the value of at least one predefined variable related to predefined contexts for discontinuous reception (DRX) cycle control during an engine-off state of the vehicle. The one or more processors are also configured to determine how a current DRX cycle should be changed responsive to the value of the at least one predefined variable in accordance with a control strategy associated with the at least one variable and, responsive to the determining how the cycle should be changed, automatically change the current DRX cycle in accordance with the control strategy while the vehicle remains powered down.

In a second illustrative embodiment, a vehicle includes one or more processors configured to determine the value of a plurality of variables related to predefined contexts for discontinuous reception (DRX) cycle control during an engine-off state of the vehicle. The one or more processors are also configured to determine how a current DRX cycle should be changed responsive to the values of the predefined variables in accordance with a control strategy associated with the plurality of predefined variables. Further, the one or more processors are configured to automatically change the current DRX cycle in accordance with the control strategy while the vehicle remains powered down, responsive to the determining how the cycle should be changed. Also, the one or more processors are configured to receive a paging request from a resource remote from the vehicle and, responsive to the paging request, set the current DRX cycle to a predefined wake cycle less than the current DRX cycle. Additionally, the one or more processors are configured to determine that a period associated with a wake state has lapsed since setting the current DRX cycle to the wake cycle and revert the DRX cycle, having been set to the predefined wake cycle, to a prior DRX cycle that preceded the setting of the DRX cycle to the wake cycle.

In a third illustrative embodiment, a non-transitory storage medium storing instructions that, when executed by one or more vehicle processors, configure the one or more vehicle processors to determine the value of a plurality of variables related to predefined contexts for discontinuous reception (DRX) cycle control during an engine-off state of the vehicle. The one or more processors are also configured to determine how a current DRX cycle should be changed responsive to the values of the predefined variables in accordance with a control strategy associated with the plurality of predefined variables and, responsive to the determining how the cycle should be changed, automatically change the current DRX cycle in accordance with the control strategy while the vehicle remains powered down. Additionally, the one or more processors are configured to receive a paging request from a resource remote from the vehicle and responsive to the paging request, set the current DRX cycle to a predefined wake cycle less than the current DRX cycle. The one or more processors are further configured to determine that a period associated with a wake state has lapsed since setting the current DRX cycle to the wake cycle and revert the DRX cycle, having been set to the predefined wake cycle, to a prior DRX cycle that preceded the setting of the DRX cycle to the wake cycle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments describe aspects of a tunable, dynamic, adaptable DRX cycle that can be better set relative to likely needs. For example, it is dynamic in the sense that it can be varied based on situational analysis. It is tunable in that a user can set preferences for longer and shorter DRX cycles. It is adaptable in that it can react to context to provide a predicted preferred cycle under certain circumstances, even in the absence of express user preferences. Moreover, it can be adapted to changing circumstances—for example, without limitation, the onset of heavy rain may reduce the DRX cycle so that a driver hurrying to the vehicle will not be forced to stand in the rain while awaiting a vehicle wake-state before a response.

For mobile-terminated features, such as vehicle control applications, to initiate command-and-control, the latency or speed of the command may be noticeable when the user is near the vehicle, and any reduction in latency may provide a better customer experience. When a vehicle is in standby mode, to reduce power consumption while still providing connectivity, the latency can be tied to how long the vehicle takes to receive a page associated with a wireless command.

For other scenarios, such as when the vehicle is in a transport mode, e.g., being transported from the factory to the dealer, power consumption may be more important. At the same time, the vehicle may still be desired or required to respond to a paging request, and so a complete shutdown may not be the most desirable outcome.

Overall, there is a balance between power consumption and service latency performance as the vehicle when drawing power from the 12V battery. The 12V battery powers the vehicle while the ignition is off for internal combustion engine (ICE) and battery electric vehicles (BEV). The 12V battery may be charged from a high voltage battery in BEV vehicles, but this may affect distance per charge and may not be possible depending on a number of factors, e.g., ambient temperature.

For the command or request triggered from a mobile device application to be processed quickly, a minimal delay in receipt of the command at the vehicle is desirable. To reach the vehicle, in at least one example, the command must first be sent and processed by the infrastructure (e.g., a backend backbone network) followed by the vehicle. Currently, commands from the backbone network to the vehicle can be sent over a data connection or short message service (SMS).

Unless the TCU is in a data call or signaling connection with dedicated resources (for example, in RRC connected mode in 3GPP terminology), it may need to be paged by a network on a configured discontinues reception (DRX) cycle to receive data or SMS. The standard DRX cycle for most networks on 3G and LTE is 1280 ms or 1.28 seconds. This adds an additional latency on average of 640 ms (i.e. equal probably of message arriving anytime during the DRX cycle duration). Following reception of the paging indication a radio registration procedure occurs to setup the radio connection to receive the data or SMS.

Reducing the DRX cycle from 1.28 second to 320 ms would reduce the latency in the worst possible scenario by 960 ms. On a 320 ms cycle initiated at the same time as a 1280 ms cycle, there would be three additional points to receive paging indications, at 320, 640 and 960 ms. On average with a 320 ms DRX paging cycle the latency becomes 160 ms.

Equally, the DRX cycle may be increased to conserve power and extend battery life, as the modem will sleep during the period between paging indications. This is applicable in scenarios where the latency is not as pressing—e.g. such when on a back-up battery mode. For example, if a vehicle is stolen, it may be desirable to increase available battery power to increase the duration of when a vehicle can be contacted for search efforts. Immediacy of response to a command issued from a mobile application is of less concern than recovery of the vehicle. This may also be true when a vehicle is left un-used for a long period of time, wherein a user would rather have the vehicle remain somewhat responsive as opposed to a faster response time that may exhaust a battery. It is possible for the modem to configure DRX cycle lengths of, for example, without limitation, 320 ms, 640 ms, 1280 ms, 2560 ms, etc. It may even be possible to configure an extended DRX (eDRX)

where cycle lengths of 5.12 sec, 10.24 sec or longer occur, if supported by the network. This enables a vehicle to be reachable for extended periods, which may be useful in situations such as transport modes where it may require a vehicle 90 days to reach the dealer. The vehicle may not be powered during the long delay (preventing recharge of the 12V battery) and so it may be useful to significantly extend the ability to contact the vehicle, even if latency is relatively high.

The following table indicates the effect of DRX cycle length on power consumption. Whereby the shorter DRX cycle decreases latency when appropriate with minimal increase of power consumption at full power. Whereas when low power consumption and low latency is acceptable the power decrease is significant.

When a telematics control unit (TCU) is in a full power state, which may, for example, exist for 30 minutes after an ignition is turned off, the power savings may be minimal. A 128 ms DRX cycle may use 170 mA of power, for example, whereas a 320 ms DRX cycle may use 173 mA of power. This would incentivize a low latency DRX cycle during this time period, unless power savings were absolutely critical. Low latency during this period also allows for increase responsiveness in many situations—quick shopping trips, refueling, etc., where the vehicle is only turned off for a brief time period and is then powered again.

At the same time, power savings may be significant (relatively speaking, at least), when varied DRX cycles are used while the TCU is in a low power sleep state. In that example, a 1280 ms DRX cycle may use 1.64 mA of power, and a 320 ms DRX cycle may use 2.81 mA of power, which is over 70 percent more power. A 640 ms DRX cycle may use, for example, 2.07 mA of power.

Overall, the DRX length can be managed progressively taking into consideration many factors including the battery state of charge, user experience, scenario, life cycle of the vehicle, etc. The TCU may convey its preferred DRX cycle, determined to be suitable for an underlying vehicle scenario, to a network (e.g., a backbone network) via signaling message in order to operate paging in a preferred DRX cycle instead of using the generic DRX cycle that the network broadcasts.

For example, in one non-limiting embodiment, during ignition on and during the first 24 hours after ignition off, a DRX cycle of 320 ms is conveyed to the network. After 24 hours, for example, the DRX cycle may be progressively updated with the network to 640 ms for seven days and then 1280 ms for the next seven days. During the example fourteen day period any wake-up of the TCU by paging may trigger the TCU to move into a full power state (DWU/DRX Wake Up) for three minutes, for example, and the DRX cycle may be updated to 320 ms during this period for lower latency. Once the wake-up period ends, the DRX cycle could then revert to the appropriate DRX length corresponding to the current time period relative to the last ignition off.

Figure 1:
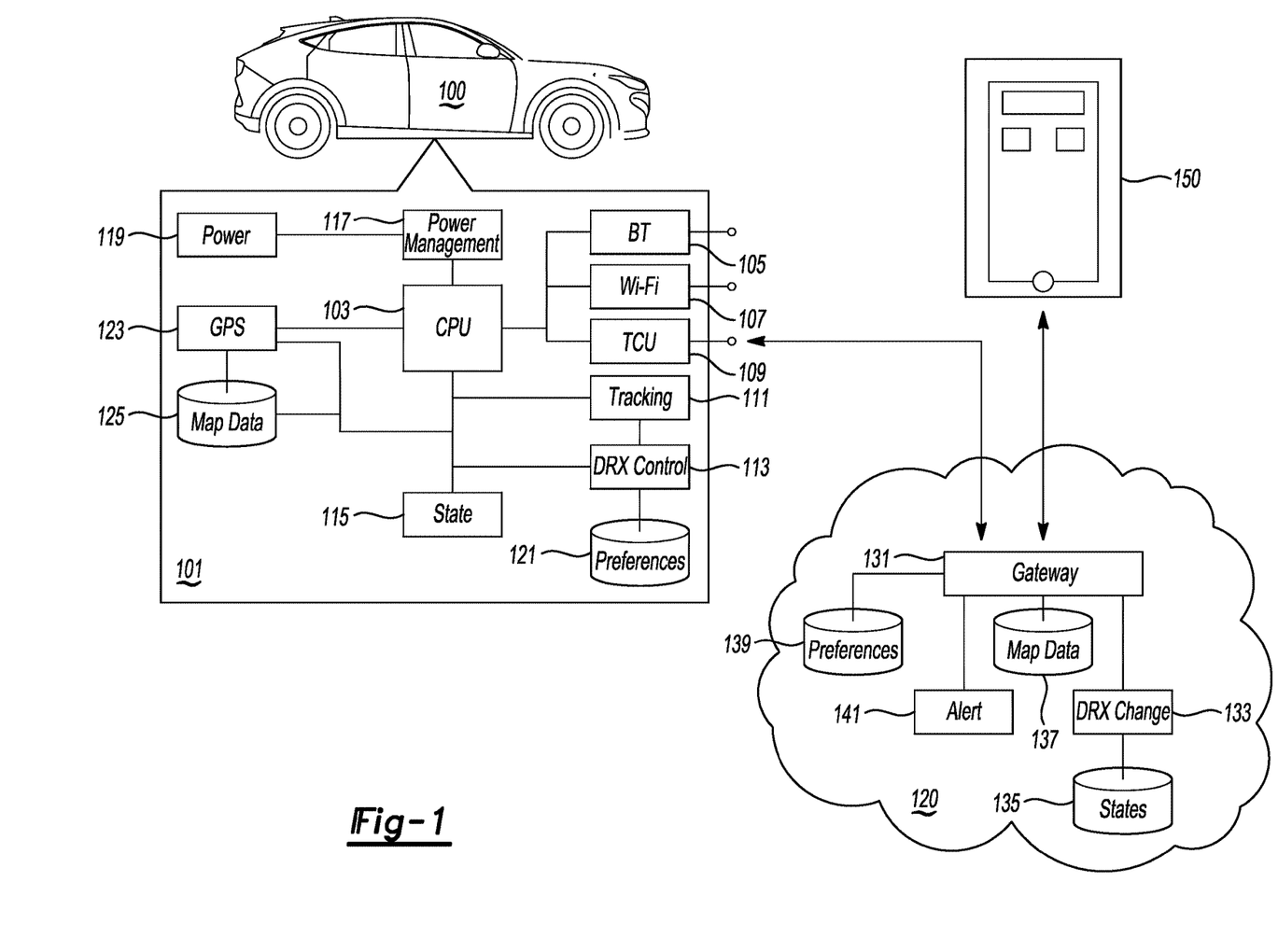
FIG. 1 shows an illustrative example of a vehicle with a controllable DRX cycle.

FIG. 1 shows an illustrative example of a vehicle with a controllable DRX cycle. In this example, vehicle 100 includes an onboard computing system 101, having one or more processors 103 provided thereto. This system may also include, for example, a plurality of connectivity options. In this example, the options include a BLUETOOTH transceiver 105, a Wi-Fi transceiver 107 and a telematics control unit 109. Wireless requests made by a remote application, such as an application running on a mobile device 150, may be relayed through the backend cloud 130 and passed to the vehicle computing system 101. Before the computing system can receive the data, for example, it may need to wake up, which could require a paging request to be sent by the backend. This request is sent to the TCU, and will be received by the TCU when the TCU reaches the end of a current DRX cycle.

The vehicle may also include a variety of processes related to DRX control, which can be thought of as separate processes or a single process. Moreover, the vehicle may be able to receive instructions from cloud-based processes or even a mobile phone process to instruct changing of the DRX cycle, reactive to various conditions. While many users will not care to achieve direct granular control over their DRX cycle, the user phone may be notified, for example, with a notice that battery power is running low. This could cause the user to agree to a suggestion to temporarily decrease vehicle response time from 0.32 seconds on average to 0.64 seconds on average (or, more likely, simply agree to temporarily decrease vehicle response time without specificity until the battery is recharged). Since the user agreed to the delayed response time, however, they will not be as likely to be caught off guard when the vehicle takes longer to respond to a remote command, to the extent they notice. In other instances the user may be notified that the response time was automatically slightly decreased temporarily so the vehicle could preserve power, but the point is that the user or the cloud may also be able to adjust the response time explicitly or implicitly through agreement to power preservation or other strategies.

In this example, one of the processes that can run on the vehicle includes a tracking process 111 that tracks how long has lapsed since a last key-off (or other relevant time cycles). This process can also track, for example, how long a vehicle has been in various DRX cycle states. A DRX control process 113 can set the current DRX cycle by reference to a base strategy (based on the tracking), user preferences 121, a vehicle state 115 or context analysis based on, for example, location provided by GPS 123 in conjunction with map data 125.

The DRX cycle control process 113 may also react to changing states of the power supply 119 as indicated by a power management process 117. Other vehicle systems may drain power unexpectedly while a vehicle is parked, for example, an alarm may persist or a vehicle light may be left enabled. This can cause the DRX control process to increase the DRX cycle to attempt to preserve battery life, even if the increase is not yet scheduled based on user preferences and/or tracking.

User preferences 121 can dictate, for example, locations or conditions when the user wants a fast response (e.g., when at work, under certain weather conditions, at night, below or above certain temperatures, etc). While many users may not set such granular settings, crowdsourced user behavior can be used to modify base settings to reflect general preferences for a locality—for example, for users who set these settings, the crowd may reflect a preference for faster response below 10 degrees Fahrenheit. In another instance, user complaints about slow response during light rain, for example, may cause a fleet-wide configuration change to any non-specified (by a user) weather related settings to decrease DRX cycle time during light rain. In this manner, vehicle response latency can be changed based on an evolving customer experience and reflect the generalized preferences of the crowed when not specified by a particular user. Vehicle state data 115 can reflect certain emergency states—e.g., without limitation, stolen, e911 call, etc., wherein battery preservation may override concerns about response latency.

Map data may indicate areas where low latency is desired. Some people may feel uncomfortable in certain regions or in certain situations and this feeling can be heightened when it seems that a vehicle is being unresponsive. Either by user designation or based on, for example, crime statistics, certain localities may have decreased DRX cycle times associated therewith based on map data. For example, users may feel uncomfortable when alone in parking garages, so if the map data indicates that the user is in a parking garage, the DRX cycle may be decreased (unless no cellular signal can be achieved, in which case the cycle may be significantly increased since paging is seemingly impossible in any event). Users may feel comfortable at public places, such as parks, unless at night, so if the user is parked at a park during the day the cycle may be increased (or set to "normal") and if the user is in a park at night the cycle may be decreased, for example. Cycles can also be decreased during common usage times based on a user's schedule or habits, for example, such as increasing cycle time at 5 PM on Friday when a vehicle is parked at home and decreasing cycle time just before 6 AM on Monday when a user usually departs for work.

The cloud 130 may include a gateway process 131 for handling incoming and outgoing requests and responses. Cloud-based processes can include, but are not limited to, DRX change process 133, which may reference states associated with a given vehicle 100 as well. For example, a user may report a vehicle 100 as stolen, but the vehicle 100 may not "realize" it has been stolen. The state can be updated in the cloud and the cloud can push a DRX change to the vehicle to maximize battery life to increase the time to find the vehicle. Updates to map data 137 at the cloud may cause cycle changes, such as, for example, cancellation of a sporting event likely to result in a large outflow of people and a desire by a user to quickly access their vehicle to depart. Again, while the actual time difference may be generally negligible in terms of effect on departure, a user rushing to a vehicle to get out ahead of a crowd may be acutely aware of any seeming non-responsiveness of the vehicle, leading to a general decrease in customer satisfaction.

Figure 2:
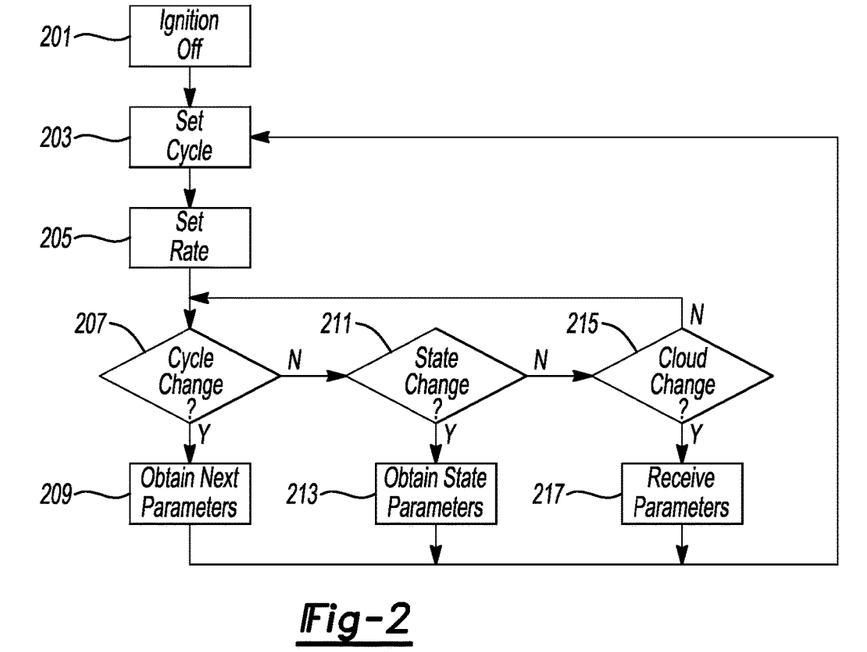
FIG. 2 shows an illustrative process for controlling a DRX cycle.

FIG. 2 shows an illustrative process for controlling a DRX cycle. In this example, a vehicle determines that the ignition has been turned off at 201, which will eventually result in the modem going into a sleep state. For some period of time, for example, 30 minutes, the modem may remain in an active state and, as noted, above, an increased DRX cycle may have a negligible effect on overall power draw (in a relative sense). The vehicle responds by setting a DRX cycle period at 203 that is a current time-period that has lapsed relative to the key-off time. The vehicle also sets a DRX cycle rate at 205 that is defined for the cycle (unless other factors, such as those discussed with respect to FIG. 6, control).

While in a given DRX cycle period, the vehicle may receive a cycle change at 207, which can be triggered by a change in the time period lapse—e.g., the duration exceeding twenty four hours. A new parameter for the DRX rate may be obtained at this point, and the cycle and rate can be set to the new parameters. A cycle may also be set as, for example, an override cycle and include a controlling variable, such as, for example "precipitation sensed," which may control the timing for that cycle until the variable expires (e.g., no more precipitation sensed) at which point a time-based cycle can resume. Cycles may also change based on certain timing changes without explicitly keeping track of which time window since key-off within which the vehicle presently sits.

A state change to the vehicle, indicated by a local state or a state passed from the cloud 130, may also cause a cycle change at 211. The state change may include an accompanying express cycle setting or the vehicle may have a default cycle associated with a given state. For example, if a vehicle is stolen, which can be indicated by a local alarm and/or a pushed notice from the cloud, the vehicle may set a maximum DRX cycle to maximally preserve battery life. As noted above, this can include extended DRX cycles of 5.12, 10.24 or even greater durations.

In addition to pushing a state change, the cloud 130 may push various other DRX changes expressly at 215. For example, if a user parks in Detroit, MI and takes a flight to London, the mobile device may recognize that the user is thousands of miles from their vehicle and probably will not need a particularly responsive vehicle until they are back in Michigan. In this instance, the mobile application can send a request to increase the DRX cycle and then, when the phone detects that the user is back in Michigan, the phone can send a request to reduce the DRX cycle to a fast-response state. This communication will occur through the cloud in most instances, and so is cast as a cloud-based request 215. This also allows the DRX cycle to adapt to a dynamic situation for which there may not be an expressly designated strategy. The parameters may be received at 217, and may include a cycle duration as well as an expected time period before reversion (if travel plans are known, for example). Further, by increasing the DRX cycle at the onset of the journey, the chance of sufficient power remaining for a fast-response DRX cycle upon return is increased, if the journey happens to be one of significant length. This entire process could occur without user intervention, if desired.

Figure 3:
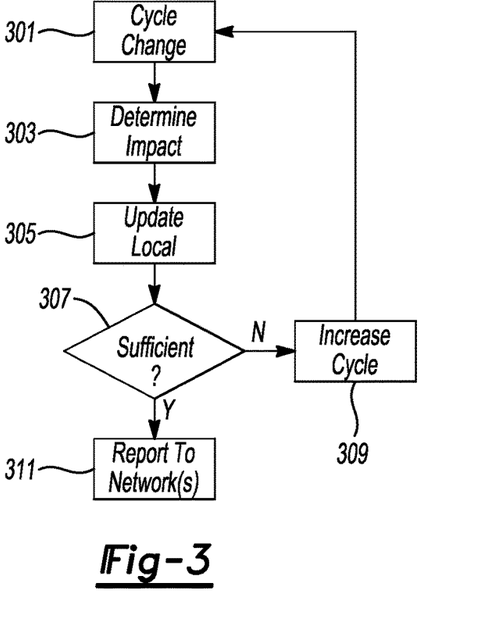
FIG. 3 shows an illustrative process for verifying a DRX cycle change.

FIG. 3 shows an illustrative process for verifying a DRX cycle change. In this example, a cycle may be about to be changed reactive to, for example, a changed condition. That is, a planned increase in cycle times may be generally correlated to battery power, but certain variables may dictate an adaptive change. In one instance, the change could be an unexpected increase in cycle time due to a depleted battery, in another instance, the change could be an unexpected decrease in cycle time responsive to heavy rain. The change is implemented at 301 and the process determines the effect on battery life at 303, which may include a projection about how much power can be used for how long, in light of the change. Local power management tools may also be updated at 305, in case they have useful feedback, such as an indication that other vehicle systems are going to be drawing increased or decreased power because of other adaptive strategies.

If the change will result in sufficient power remaining according to a general power control strategy at 307, the process may report the changed cycle to the backbone or other paging networks at 311. If the proposed change is too aggressive, using too much power, for example, the process can increase the cycle time another iteration at 309 and repeat the process. Even an increase in cycle time (which decreases power usage) may be "too aggressive," (in terms of power usage) because it may not be enough of an increase, if a battery is in a highly depleted state. In other instances, a decrease in cycle time may be considered too aggressive if it will reduce cycle time for a prolonged period of time, for example, when a battery is depleted. Thus, the adaptive and dynamic nature of the changeable DRX cycle can be controlled to balance vehicle availability with power preservation.

Figure 4:
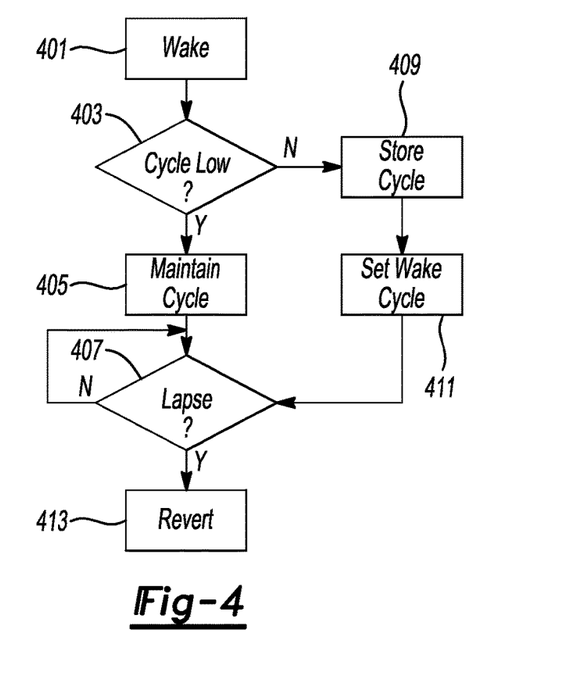
FIG. 4 shows illustrative wake-up handling process.

FIG. 4 shows illustrative wake-up handling process. In this example, the vehicle wakes at 401 at determines if the DRX cycle is at the lowest state at 403. If the cycle is at the lowest state, e.g., 320 ms in one embodiment, the process maintains the cycle for the duration of the wake state at 405. The wake state may only exist for a predetermined time period, e.g., 3 minutes, to receive and process remote commands received from the cloud, for example. This time is set based on expected command processing and can be varied based on, for example, an originating request that identifies the basis for the wake (e.g., an expected handling time). Once the state lapses at 407, the process can revert to a prior DRX cycle at 413. In the example where the cycle was already at 320 ms, this reversion is just a maintenance of the prior cycle. Timing for cycle changes can continue during the wake state or be suspended, and if the timing continues, the vehicle may also progress to the next DRX cycle following the wake state if the cycle periods changed during the wake state.

For example, if a vehicle is designated to remain in a 320 ms DRX cycle for the first 24 hours and then shift to a 640 ms DRX cycle, the wake state may occur between the transition in time to the time past the 24 hour threshold. In this instance, the process may shift to the 640 ms DRX cycle once the wake state completed, as opposed to reverting to the 320 ms cycle that was present before the wake state occurred.

If the cycle is already longer than the minimum cycle at 405, the process can log the current cycle time at 409 and set the desired lower latency DRX cycle at 411. Then, when the wake state lapses at 407, the process can again revert to the stored prior DRX cycle.

Figures 5, 6:
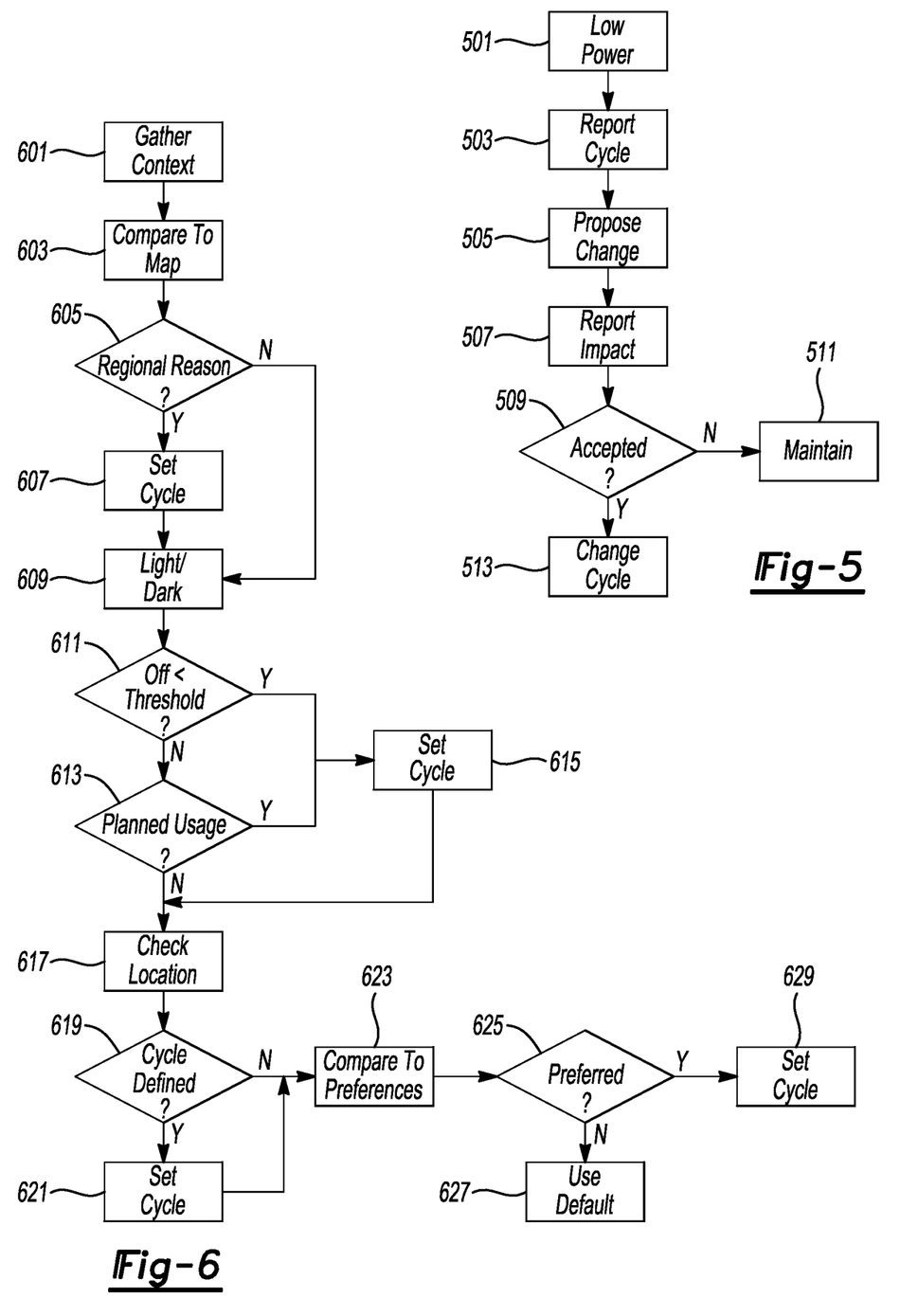
FIG. 5 shows an illustrative low power adaptation process.
FIG. 6 shows an illustrative context-adaptable DRX cycle control process.

FIG. 5 shows an illustrative low power adaptation process. In this example, the process detects a low power state at 501. For example, the vehicle has been left unpowered for a significant period of time, other vehicle systems are draining the battery, the battery is old or affected by weather conditions, etc. When the power is diminished beyond a threshold, for example, such that a current DRX cycle will be overtaxing for an expected duration, or will not be able to run for a planned amount of time, the process can report the current DRX cycle at 503 and a proposed change at 505.

The process may determine the proposed change based on information from power management and analysis of the remaining battery power. This could include a shift to a next-slower DRX wake state cycle or a shift to an extended DRX wake state to at least preserve some remote access capability if the battery was very low. The process may also report the projected effect of the change, e.g., in terms of latency and expected remaining possible remote access time.

This can be presented to a user, on a mobile device, for example, in a manner easily comprehensible. For example, a technical report to the user could state—"Current DRX cycle 640 ms, leading to 0.32 s latency. Maintainable for 3 days. Proposed change to 1280 ms, 0.64 s latency, maintainable for 5 days." On the other hand, the system may report something more understandable, such as "Your vehicle needs to preserve power to maintain remote access. This may result in a slight delay in command processing, but will increase remote access duration from 3 days to 5. Please confirm if you require remote access for more than 3 days and do not intend to return to your vehicle prior to that point." The user could then confirm the change. Any combination of factual and "user-understandable translation" could be presented.

If the user accepts the change to the DRX cycle at 509, the process can change the cycle to the proposed cycle at 513. Otherwise, the process can maintain the current DRX cycle 511. The process may also contemplate context when determining the change or proposed change. For example, if the process has access to a user calendar or flight schedule and knows that the user is likely to use the vehicle within 3 days (in the preceding example), the process may not propose the change. Similarly, if the expected usage was more than 5 days out, then the process may propose a more aggressive change to the DRX cycle.

FIG. 6 shows an illustrative context-adaptable DRX cycle control process. In this example, the process gathers context designated as relevant for DRX considerations. This can include, for example, but is not limited, location (GPS or a particular known location, e.g. home), battery life, planned usages, historical behavior, weather forecast, current weather, temperature, time, variables corresponding to user preferences, etc. Context may be a defined set of applicable variables based on an original equipment manufacturer (OEM) definition and may also be user specified or correlated to user preferences.

Here, the process gathers coordinate data as one example and compares that data to a map data set at 603. The map data may have appended permanent or temporary DRX cycle recommendations associated therewith. For example, areas of crime above a threshold, or certain types of crime above a threshold, may have a minimum DRX cycle associated therewith, so as not to impede a user hurrying to a vehicle. Again, in situations where a user feels uneasy, any latency may be more noticeable to that user, even if the net amount of time delay experienced relatively small. In many situations, the delay being kept to a minimal amount for the first 24 hours may be sufficiently accommodative, but if a more granular adjustment period is used, then the context may become more relevant—e.g., if the DRX cycle is changed after every 30 minutes.

Another example context includes light/dark, based on ambient light at 609. When the ambient light falls below a threshold, for example, this may cause a decrease in the DRX cycle, either by default or based on user preference, to increase responsiveness of the vehicle at night. This can also be keyed to certain times of day and/or map data. For example, if a DRX cycle was at 1280, it could decrease to 640 from 8 PM to 12 AM, to 320 from 12 AM to 2 AM, and then revert. This may occur, for example, if a user is observed often using the vehicle at night (such as a person who frequents clubs or bars). Other users who rarely use the vehicle after 8 PM may not experience the same DRX cycle change, unless, for example, their vehicle is parked in an area with elevated crime statistics after dark or after certain hours.

In this example, the process determines whether the vehicle is powered off for less than a threshold amount of time during the relevant period (e.g., in the dark, at the time range, etc.) at 611 and/or whether there is any planned known usage at 613. Planned usage can include, for example, access to a calendar or flight schedule, or even the fact that the vehicle is not parked at a home location or common parking location and thus is likely to still need to be driven home, even if exact plans are not known. In instances where context indicates a likelihood of usage, the DRX cycle may be decreased in length.

In another example, a location may have a personal preference associated therewith, such as "home" or "office" having a "minimal delay" preference. Users running perpetually late for school or work may not want the perception of even a slight delay in response when they are already running behind. The process checks the current location at 617 and determines if there is a defined cycle at 619, which can be set at 621 if the cycle exists. This allows a user to specify (or the vehicle to specify) low-latency scenarios, for example, at places where the user will commonly want the vehicle to be responsive.

Finally, in this example, the process checks user preferences at 623 to determine if there are any other context variables met. Users may specify combinations of factors that change latency based on their own preferences, and the vehicle can consider these factors to either set a defined cycle at 629 when met, or use a default vehicle setting at 627 when no preferences indicate otherwise.

As noted above, weather conditions and other factors can also play a role in adaptive latency control. The examples preceding are merely illustrative and are not intended to limit scope or restrict application to the examples presented. The general idea includes controllable DRX cycles that can be applied in a defined manner and/or that can be reactive and adaptive to changing circumstances.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   one or more processors configured to:
   determine the value of at least one predefined variable related to predefined contexts for discontinuous reception (DRX) cycle control during an engine-off state of the vehicle;
   determine how a current DRX cycle should be changed responsive to the value of the at least one predefined variable in accordance with a control strategy associated with the at least one variable; and
   responsive to the determining how the cycle should be changed, automatically change the current DRX cycle in accordance with the control strategy while the vehicle remains powered down.

2. The vehicle of claim 1, wherein the one or more processors are further configured to:
   receive a paging request from a resource remote from the vehicle;
   responsive to the paging request, set the current DRX cycle to a predefined wake cycle;
   determine that a period associated with a wake state has lapsed since setting the current DRX cycle to the wake cycle; and
   revert the DRX cycle, having been set to the predefined wake cycle, to a prior DRX cycle that preceded the setting of the DRX cycle to the wake cycle.

3. The vehicle of claim 1, wherein the variable includes time lapsed since the engine was powered off and wherein the control strategy includes increasing the DRX cycle at predefined intervals as time lapsed increases.

4. The vehicle of claim 1, wherein the variable includes a predefined weather condition and wherein the control strategy includes decreasing the DRX cycle while the weather condition persists.

5. The vehicle of claim 4, wherein the predefined weather conditions include at least one of temperature below a first threshold, temperature above a second threshold or precipitation.

6. The vehicle of claim 1, wherein the variable includes a time-of-day and wherein the control strategy includes changing the DRX cycle responsive to a predefined time periods within which the value of the time-of-day falls.

7. The vehicle of claim 1, wherein the variable includes ambient light and wherein the control strategy includes decreasing the DRX cycle responsive to ambient light being below a predefined threshold.

8. The vehicle of claim 1, wherein the variable includes remaining battery power and wherein the control strategy includes increasing the DRX cycle responsive to battery power below a threshold, and wherein the one or more processors are further configured to:
   contact a remote user wireless device prior to increasing the DRX cycle responsive to the battery power below the threshold;
   inform the user of a delay in response time that will occur responsive to increasing the DRX cycle; and
   responsive to confirmation received from the user wireless device approving the increase, increase the DRX cycle responsive to the battery power below the threshold.

9. A vehicle comprising:
   one or more processors configured to:
   determine the value of a plurality of variables related to predefined contexts for discontinuous reception (DRX) cycle control during an engine-off state of the vehicle;
   determine how a current DRX cycle should be changed responsive to the values of the predefined variables in accordance with a control strategy associated with the plurality of predefined variables;
   responsive to the determining how the cycle should be changed, automatically change the current DRX cycle in accordance with the control strategy while the vehicle remains powered down;
   receive a paging request from a resource remote from the vehicle;
   responsive to the paging request, set the current DRX cycle to a predefined wake cycle less than the current DRX cycle;
   determine that a period associated with a wake state has lapsed since setting the current DRX cycle to the wake cycle; and
   revert the DRX cycle, having been set to the predefined wake cycle, to a prior DRX cycle that preceded the setting of the DRX cycle to the wake cycle.

10. The vehicle of claim 9, wherein the variables includes time lapsed since the engine was powered off and a predicted use time and wherein the control strategy includes increasing the DRX cycle at predefined intervals as time lapsed increases and then decreasing the DRX cycle within a predefined threshold time of the predicted use time.

11. The vehicle of claim 9, wherein the variable includes a predefined weather condition and wherein the control strategy includes decreasing the DRX cycle while the weather condition persists.

12. The vehicle of claim 11, wherein the predefined weather conditions include at least one of temperature below a first threshold, temperature above a second threshold or precipitation.

13. The vehicle of claim 9, wherein the variable includes a time-of-day and wherein the control strategy includes changing the DRX cycle responsive to a predefined time periods within which the value of the time-of-day falls.

14. The vehicle of claim 9, wherein the variable includes ambient light and wherein the control strategy includes decreasing the DRX cycle responsive to ambient light being below a predefined threshold.

15. The vehicle of claim 9, wherein the variable includes remaining battery power and wherein the control strategy includes increasing the DRX cycle responsive to battery power below a threshold, and wherein the one or more processors are further configured to:
  contact a remote user wireless device prior to increasing the DRX cycle responsive to the battery power below the threshold;
  inform the user of a delay in response time that will occur responsive to increasing the DRX cycle; and
  responsive to confirmation received from the user wireless device approving the increase, increase the DRX cycle responsive to the battery power below the threshold.

16. A non-transitory storage medium storing instructions that, when executed by one or more vehicle processors, configure the one or more vehicle processors to:
  determine the value of a plurality of variables related to predefined contexts for discontinuous reception (DRX) cycle control during an engine-off state of the vehicle;
  determine how a current DRX cycle should be changed responsive to the values of the predefined variables in accordance with a control strategy associated with the plurality of predefined variables;
  responsive to the determining how the cycle should be changed, automatically change the current DRX cycle in accordance with the control strategy while the vehicle remains powered down;
  receive a paging request from a resource remote from the vehicle;
  responsive to the paging request, set the current DRX cycle to a predefined wake cycle less than the current DRX cycle;
  determine that a period associated with a wake state has lapsed since setting the current DRX cycle to the wake cycle; and
  revert the DRX cycle, having been set to the predefined wake cycle, to a prior DRX cycle that preceded the setting of the DRX cycle to the wake cycle.

17. The storage medium of claim 16, wherein the variables includes time lapsed since the engine was powered off and a predicted use time and wherein the control strategy includes increasing the DRX cycle at predefined intervals as time lapsed increases and then decreasing the DRX cycle within a predefined threshold time of the predicted use time.

18. The storage medium of claim 16, wherein the variable includes a predefined weather condition and wherein the control strategy includes decreasing the DRX cycle while the weather condition persists.

19. The storage medium of claim 16, wherein the variable includes a time-of-day and wherein the control strategy includes changing the DRX cycle responsive to a predefined time periods within which the value of the time-of-day falls.

20. The storage medium of claim 16, wherein the variable includes ambient light and wherein the control strategy includes decreasing the DRX cycle responsive to ambient light being below a predefined threshold.

* * * * *